(12) United States Patent
Reid et al.

(10) Patent No.: US 7,279,057 B2
(45) Date of Patent: *Oct. 9, 2007

(54) METHOD OF FINISHING A WOOD SUBSTRATE

(75) Inventors: Thomas J. Reid, White Bear Lake, MN (US); Jeffrey R. Janssen, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 344 days.

This patent is subject to a terminal disclaimer.

(21) Appl. No.: 10/949,897

(22) Filed: Sep. 24, 2004

(65) Prior Publication Data

US 2005/0039838 A1 Feb. 24, 2005

Related U.S. Application Data

(63) Continuation of application No. 09/678,570, filed on Oct. 3, 2000, now Pat. No. 6,811,628.

(51) Int. Cl.
*B32B 27/30* (2006.01)
*B32B 27/40* (2006.01)
*B32B 31/04* (2006.01)

(52) U.S. Cl. .......................... 156/71; 156/94; 156/310; 156/327; 428/41.5; 52/309.3

(58) Field of Classification Search ............... None
See application file for complete search history.

(56) References Cited

U.S. PATENT DOCUMENTS

| | | |
|---|---|---|
| 3,314,838 A | 4/1967 | Erwin |
| 3,607,540 A | 9/1971 | Hoogstoel |
| 3,681,179 A | 8/1972 | Theissen |
| 4,944,514 A | 7/1990 | Suiter |

(Continued)

FOREIGN PATENT DOCUMENTS

AU 265749 7/1963

(Continued)

OTHER PUBLICATIONS

"3M Scotchcal Paint Protection Film For the Professional Applicator", 3M Automotive Aftermarket Division, 75-3469-1065-8, Oct. 1999.

(Continued)

*Primary Examiner*—Sam Chuan Yao
(74) *Attorney, Agent, or Firm*—Pamela L. Stewart

(57) ABSTRACT

The present invention provides a method of finishing a wood surface for exterior exposure of the wood using a finishing film material in the form of a sheet. The finishing film comprises a flexible polymeric sheet material having a first major surface and a second major surface and a pressure sensitive adhesive layer covering at least a portion of the first major surface of the sheet material. The finishing film is adhered to the surface to the wood surface by the adhesive layer. The method of the present invention is particularly suitable for the finishing of brightwork on boats, for example, teak or mahogany brightwork. The method of the present invention is particularly suitable for finishing curved and/or compound curved surfaces due to the flexibility and elongation of the finishing film.

15 Claims, 1 Drawing Sheet

U.S. PATENT DOCUMENTS

| | | | |
|---|---|---|---|
| 5,132,164 A | | 7/1992 | Moriya et al. |
| 5,196,246 A | * | 3/1993 | Kauss et al. ................... 428/39 |
| 5,256,472 A | | 10/1993 | Moriya et al. |
| 5,650,215 A | | 7/1997 | Mazurek et al. |
| 6,045,920 A | * | 4/2000 | Ou-Yang et al. ............ 428/483 |
| 6,221,465 B1 | * | 4/2001 | Hori et al. ................ 428/195.1 |
| 6,524,675 B1 | | 2/2003 | Mikami et al. |

FOREIGN PATENT DOCUMENTS

| | | | |
|---|---|---|---|
| CN | 1105088 A | | 7/1995 |
| DE | 8214634.9 | | 9/1982 |
| DE | 4206021 A1 | | 9/1993 |
| DE | 19549138 A1 | | 7/1997 |
| EP | 0926214 A2 | | 6/1999 |
| EP | 0949120 A | | 10/1999 |
| FR | 2663586 | | 12/1991 |
| GB | 1449883 | | 9/1976 |
| JP | 48-29397 | * | 9/1973 |
| WO | WO94/00525 | | 1/1994 |
| WO | WO98/29516 | | 7/1998 |

OTHER PUBLICATIONS

"3M Scotchcal High Performance Protection Film Marine Applications", 3M Marine Trades, 75-3469-1179-7, month unknown, 1999.

"3M Scotchcal Paint Protection Film Application Steps", 3M Automotive Aftermarket Division, 75-3469-1199-5, month unknown, 1999.

"3M Scotchcal Pain Protection Film A Clear Alternative to Vehicle Bras or Guards.", 3M Automotive Aftermarkets Division, 75-3467-9992-9, month unknown, 1999.

"3M High Performance Protective Products", 3M Automotive Design Systems Division, 75-3468-5045-8, month unknown; 1995.

"3M Scotchcal Paint Protection Film", 3M Automotive Aftermarkets Division, month unknown, 1995.

"3M High Performance Protective Film Applications", 3M Automotive Design Systems Division, 75-3467-4669-8, month unknown; 1995.

"3M Scotchcal Paint Protection Film", 3M Automotive Trades Division, 75-3467-9978-8, date unknown.

"Newcomers Bristol and Woolsey Are Promising Teak Treatments", Practical Sailor, vol. 26, No. 5 & 6, Mar. 2000, pp. 10, 11, 16 and 17.

3M News, "3M Offers the Clear Advantage in Paint Protection", Automotive Trades Division, St. Paul, MN, Oct. 15, 1995.

"3M Scotchcal™ High Performance Custom Striping Tape, 2000 Color Card and Pattern Availability Chart", 3M Automotive Aftermarket Division, 75-3468-6450-9(7913)NPI, date unknown.

"Protection Against the Odds, The Adventure of a Lifetime", 3M Automotive Division, 75-3469-1193-8, month unknown, 1999.

"3M Scotchcal Paint Protection Film Patterning, Cutting and Application Procedures for Roll Goods for Professional Applicators", 3M Automotive Aftermarket Division, 75-3469-1131-8, Oct. 1999.

* cited by examiner

METHOD OF FINISHING A WOOD SUBSTRATE

CROSS REFERENCE TO RELATED APPLICATION

This application is a continuation of U.S. application Ser. No. 09/678,570, filed Oct. 3, 2000, now U. S. Pat. No. 6,811,628.

BACKGROUND

Many boats are appointed with brightwork, that is, interior or exterior wood that has been finished with a non-opaque varnish, oil or sealer that leaves the natural grain of the wood exposed. Typically, brightwork comprises weather-resistant woods such as teak or mahogany. Although beautiful when first finished, the appearance of exterior brightwork often deteriorates rapidly due to the harsh combination of sunlight and moisture. As the surface deteriorates, teak brightwork turns from reddish-brown in color with a glossy surface to gray in color with a dull surface. When subjected to extreme outdoor exposure, for example, in tropical regions, teak brightwork may require refinishing as often as several times per year.

The process of refinishing brightwork that was first finished with conventional liquid applied coatings is labor intensive and expensive, requiring the use of chemical strippers and/or abrasives to remove the weathered coating. In addition, many liquid-applied coatings must be applied to brightwork in the form of an organic solvent-borne coating (i.e., a prepolymer or polymer dissolved in an organic solvent), resulting in the release of volatile organic compounds (i.e., VOC's) as the coating dries. The art has recognized generally the need to improve the process of finishing and refinishing brightwork. The solution generally followed is to improve the performance of the liquid-applied coatings in order to provide coatings that last for a longer period of time when exposed to the environment.

In view of the foregoing, a method of finishing wood surfaces, for example, brightwork that lasts longer and is easier to refinish than conventional liquid applied coatings is desired.

SUMMARY

The present invention provides a method of finishing a wood surface for exterior exposure of the wood, the method comprising the steps of:
(a) providing a finishing film material in the form of a sheet, said finishing material comprising:
  (i) a flexible polymeric sheet material having a first major surface and a second major surface;
  (ii) a pressure sensitive adhesive layer covering at least a portion of the first major surface of the sheet material;
(b) providing a wood substrate having a surface; and
(c) adhering the adhesive layer of the finishing film material to the surface of the wood by placing the adhesive layer of the finishing film in contact with the surface of the wood substrate and optionally applying pressure and/or heat over at least a portion of the finishing film.

The method of the present invention is particularly suitable for the finishing of brightwork on boats, for example, teak or mahogany brightwork. The method of the present invention is particularly suitable for finishing curved and/or compound curved surfaces due to the flexibility and elongation of the finishing film.

In one preferred embodiment, the polymeric sheet material comprises an aliphatic polyurethane. Preferably, the polymeric sheet material has a percent elongation of about 60% or greater and has a thickness ranging from about 3 to 18 mils (75 to 450 µm), more preferably ranging from about 5 to 12 mils (125 to 300 µm). In a preferred embodiment, the polymeric sheet material comprises an ultraviolet stabilizer and/or an ultraviolet absorber.

In another preferred embodiment, the adhesive layer comprises an acrylic adhesive, more preferably comprising a copolymer of isooctyl acrylate and acrylic adhesive. The adhesive layer preferably has a thickness ranging from about 12 to 250 µm, more preferably ranging from about 25 to 125 µm. In a preferred embodiment, the adhesive layer is repositionable. Repositionable adhesive layers may be provided, for example, by overcoating the adhesive with a water-soluble detackifying coating or by providing the adhesive with a microstructured surface topography.

In another preferred embodiment, the method of the present invention includes the step of coating the surface of the wood substrate with a liquid coating composition comprising a polymer or polymer precursor dispersed or dissolved in a liquid. The liquid coating composition preferably comprises an aliphatic polyurethane polymer dispersed or dissolved in a solvent.

In another preferred embodiment, the method of the present invention includes the step of wetting the surface of the wood substrate with a wetting solution prior to adhering the adhesive.

DETAILED DESCRIPTION

Figure 1:
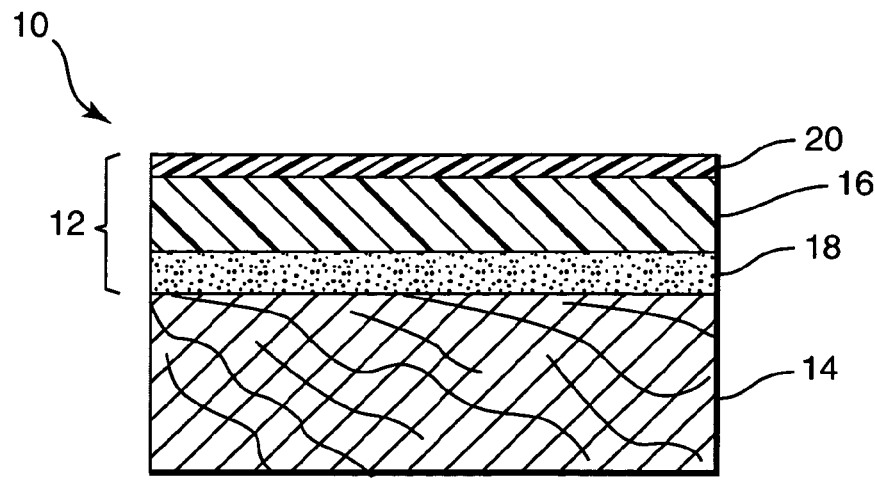
FIG. 1 is a cross-sectional view of a wood substrate finished in accordance with the method of the present invention.

Referring now to FIG. 1, wood substrate finished in accordance with the method of the present invention 10 is shown. FIG. 1 includes finishing film 12 bonded to the surface of wood substrate 14. Finishing film 12 comprises polymer layer 16, pressure sensitive adhesive layer 18, and optional clear coat layer 20. Preferably, and in the embodiment of FIG. 1, adhesive layer 18 is contiguous with polymer layer 16. Similarly, clear coat layer 20 is contiguous with polymer layer 16. As shown in the FIG. 1, clear coat layer 20 forms the outer (top) surface of the finished wood substrate 10.

Figure 2:
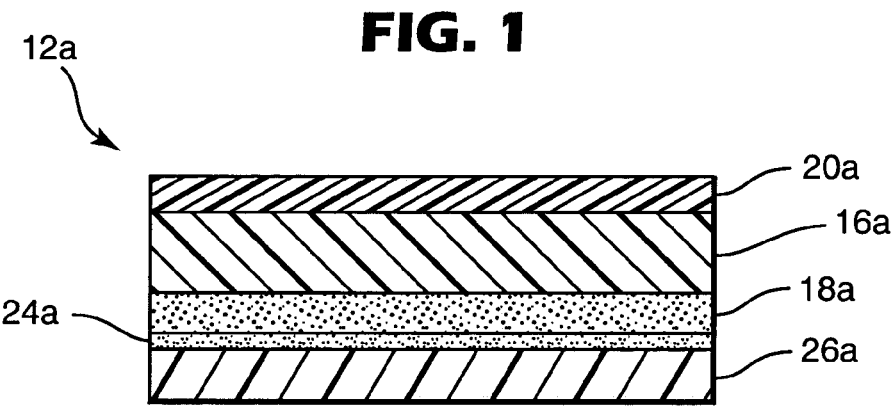
FIG. 2 is a cross sectional view of a finishing film suitable for use in the method of the present invention.

Referring now to FIG. 2, finishing film 12a is shown prior to application of the film to a wood substrate. Finishing film 12a comprises polymer layer 16a, pressure sensitive adhesive layer 18a, optional clear coat layer 20a, optional water-soluble layer 24a, and optional release liner 26a. Pressure sensitive adhesive layer 18a is preferably contiguous with polymer layer 16a. Release liner 26a is releasably attached to pressure sensitive adhesive layer 18a and water-soluble layer 24a. Water-soluble layer 24a is preferably contiguous with pressure sensitive adhesive layer 18a. Prior to application of finishing film 12a to a wood substrate, release liner 26a is first removed. Water soluble layer 24a is then dissolved using a wet application process thereby exposing pressure sensitive adhesive layer 18*a* for adhesive bonding to the wood substrate.

Figure 3:
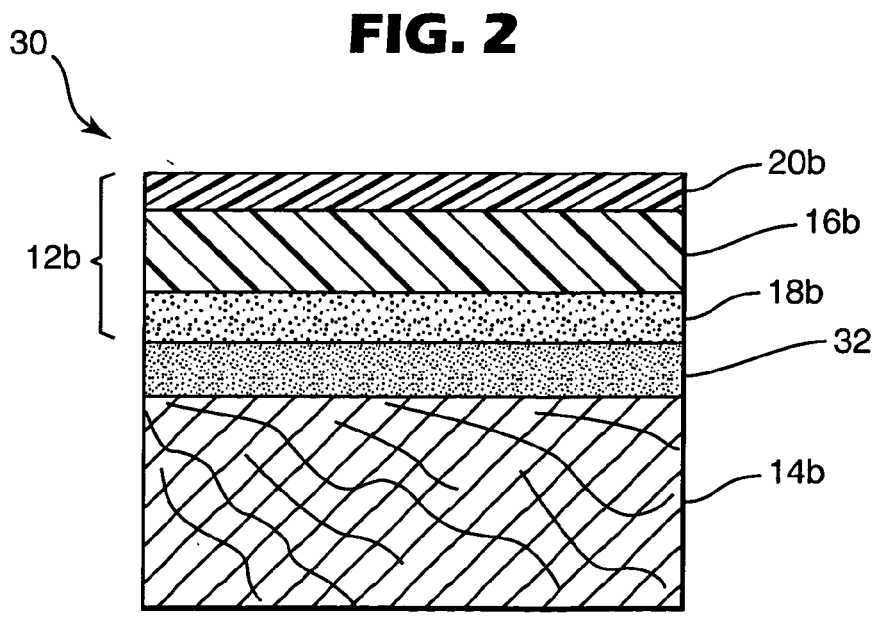
FIG. 3 is a cross-sectional view of a wood substrate finished in accordance with the method of the present invention.

Referring now to FIG. 3, wood substrate finished in accordance with the method of the present invention 30 is shown. In FIG. 3, finished wood substrate 30 includes liquid applied coating 32 that is applied over wood substrate 14*b* prior to adhering finishing film 12*b* thereto. Liquid applied coating 32 may be applied to wood substrate in a single coating application or in multiple applications. Finishing film 12*b* comprises polymer layer 16*b*, pressure sensitive adhesive layer 18*b*, and optional clear coat layer 20*b*. Preferably, pressure adhesive layer 18*b* is contiguous with polymer layer 16*b*. Preferably, clear coat layer 20*b* is also contiguous with polymer layer 16*b*.

The various components of finishing films suitable for use in the method of the present invention will now be described individually in detail.

Polymer Layer:

The polymer layer may comprise one or more individual layers of polymeric material which may comprise the same or different polymer types. Representative examples of polymers include aliphatic polyurethanes, polyesters, polyolefins (e.g., polyethylene or stabilized PVC). Polyurethanes are typically formed by reacting polyisocyanates with polyols. Preferred isocyanates are aliphatic isocyanates. Preferred polyols include polyester polyols such as polycaprolactone based polyols, acrylic polyols and the like. Generally, the polymer layer may range in thickness from about 3-18 mils (0.076-0.46 mm), more preferably ranging from about 5-12 mils (0.13-0.30 mm). Thicker films provide increased protection for the substrate whereas thinner films are generally easier to apply. When the wood substrate to be finished has a curved or compound curved surface, the polymer layer will preferably have suitable flexibility and elongation to allow the finishing material to bend and follow the contour of the wood substrate. Preferably, the polymer layer will have a percent elongation at break of at least about 60% or greater.

Polyuethane polymers suitable for the polymer layer may be formed as the reaction product of a polyisocyanate and a polyol. Polyisocyanates comprise compounds having two isocyanate groups (i.e., diisocyanates and/or adducts thereof) and may optionally comprise compounds having greater than two isocyanate groups (e.g., triisocyanates and/or adducts thereof). Adducts of the polyisocyanate compounds as defined herein refer to isocyanate functional derivatives of polyisocyanate compounds and polyisocyanate prepolymers. Examples of adducts include but are not limited to ureas, biurets, allophanates, dimers and trimers of isocyanate compounds, uretidinediones, and mixtures thereof. Any suitable organic polyisocyanate, such as an aliphatic, cycloaliphatic, araliphatic or aromatic polyisocyanate, may be used either singly or in mixtures of two or more. The aliphatic isocyanates provide generally better light stability than the aromatic isocyanates.

Examples of useful cycloaliphatic polyisocyanates include but are not limited to dicyclohexylmethane diisocyanate ($H_{12}MDI$, commercially available under the trade designation "DESMODUR W" from Miles Coating Division), isophorone diisocyanate (IPDI), 1,4-cyclohexane diisocyanate (CHDI), 1,4-cyclohexanebis(methylene isocyanate) (BDI), 1,3-bis(isocyanatomethyl)cyclohexane ($H_6XDI$), and mixtures thereof.

Examples of useful aliphatic polyisocyanates include but are not limited to hexamethylene 1,6-diisocyanate (HDI) including trimers, biurets, allophonates, and isocyanurates thereof, 1,12-dodeeane diisocyanate, 2,2,4-trimethyl-hexamethylene diisocyanate (TMDI), 2,4,4-trimethyl-hexamethylene diisocyanate (TMDI), 2-methyl-1,5-pentamethylene diisocyanate, dimer diisocyanate, the urea of hexamethyl diisocyanate, and mixtures thereof.

Examples of useful araliphatic polyisocyanates include but are not limited to m-tetramethyl xylylene diisocyanate (m-TMXDI), p-tetramethyl xylylene diisocyanate (p-TMXDI), 1,4-xylylene diisocyanate (XDI), and 1,3-xylylene diisocyanate, and mixtures thereof.

Preferred polyisocyanates, in general, include isophorone diisocyanate, toluene diisocyanate, dicyclohexylmethane 4,4'-diisocyanate, MDI, derivatives of all the aforementioned, and mixtures thereof.

Polyisocyanates or polyisocyanate adducts containing more than two isocyanate groups in the molecule can be included to introduce branching into the prepolymer which enhances the solvent resistance, water resistance and hardness of polymers layers made therefrom. Limited amounts of polyisocyanates containing greater than 2 isocyanate groups can be employed. Typical isocyanates from this group include but are not limited to triphenylmethane 4,4', 4''-triisocyanate, tris-(4-isocyanatophenyl)-thiophosphate, fluorinated and/or silicone containing derivatives of the aforementioned and the like. Similarly, limited amounts of polyisocyanate adducts containing more than two isocyanate groups can be employed, including but not limited to those selected from the group consisting of trimer of isophorone diisocyanate (commercially available under the trade designation "POLYISOCYANATE IPDI-T 1890" from Hüls America), and trimer of HDI (commercially available under the trade designation "DESMODUR N3300" from Miles Polymer Division), trimer of m-tetramethylxylene diisocyanate (a trifunctional polyisocyanate adduct of trimethylolpropane and m-tetramethylxylene diisocyanate commercially available under the trade designation "CYTHANE 3160" from American Cyanamid Co.).

In order to minimize the deteriorative effect of ultra-violet light on the finishing material and/or the substrate, the polymer layer may further include one or more stabilizers against thermal and ultra-violet degradation. Such stabilizers include, for example, o-hydroxybenzophenones, cyanoacrylate esters, 2-(o-hydroxyphenyl)benzotriazoles, hindered amine light stabilizers (HALS), antioxidants, copolymerizable UV absorbers and the like. Suitable ultra-violet absorbers are commercially available under the trade designation "UVINUL" from BASF Corporation (Rensselear, N.Y.), "CHIMASSORB" and "TINUVIN" from Ciba Specialty Chemicals (Tarrytown, N.Y.), "CYASORB" from Cytec Industries (West Paterson, N.J.), and from China Scientific Fine Chemicals Ltd., (Taichung, Taiwan) and are typically added to the polymer layer in an amount ranging from about 0.1-10 percent by weight.

The polymer layer may be manufactured using any conventional process, for example, extrusion, calendaring, wet casting, and the like. It may be desirable in some instances to emboss the surface of the polymer layer with a surface pattern. A surface pattern may be desirable in order to impart to the finishing film anti-slip properties.

Optionally, the polymer layer may be embossed on its major surface in order to provide a surface having anti-slip characteristics. For example, the surface may include a plurality of small cavities or recesses.

Adhesive Layer:

The finishing film is adhered to the wood substrate by means of a layer of pressure sensitive adhesive. The pressure sensitive adhesive layer may comprise any of a number of conventionally known types of pressure sensitive adhesive and should be chosen to be compatible with and adherent to both the wood substrate and the polymer layer. Useful adhesives can include acrylates, natural- or synthetic-rubber adhesives, homo- or co-polymerized alpha-olefins that are at least partially amorphous in nature, post-curable PSA-structural adhesive combinations, silicone-ureas, and the like, so long as the adhesive and its monomeric precursors are compatible with the polymer layer.

When the method of the present invention is employed to finish a wood substrate that will receive outdoor exposure (e.g., exterior marine brightwork), the pressure sensitive adhesive must be chosen to provide acceptable weatherability. One preferred class of pressure sensitive adhesives that are resistant to degradation from ultra-violet radiation are acrylic pressure sensitive adhesives.

Acrylic pressure sensitive adhesives comprising one or more polymerized acrylic acid non-tertiary alcohol ester monomers generally provide acceptable outdoor weatherability. These types of adhesives are reported, for example, in U.S. Reissue Pat. No. 24,906. Acrylate adhesives are typically copolymers of a major proportion of an acrylic acid ester of a non-tertiary alcohol containing from about 4 to about 14 carbon atoms and a minor portion of at least one modifying polar acrylic-type monomer. Acrylic acid esters useful in adhesives of the multilayered films of the invention may include, but are not limited to n-butyl acrylate, hexyl acrylate, heptyl acrylate, octyl acrylate, isooctyl acrylate, 2-ethylhexyl acrylate, isobornyl acrylate, and combinations thereof. Preferred acrylic acid esters include isooctyl acrylate, 2-ethylhexyl acrylate, isobornyl acrylate, and combinations thereof. Modifying polar acrylic-type monomers may include, but are not limited to, acrylic acid, methacrylic acid, acrylamide, methacrylamide, acrylonitrile, methacrylonitrile, N-vinylpyrrolidone, N-substituted acrylamides such as, hydroxyalkyl acrylates, maleic anhydride, itaconic acid, and combinations thereof.

Photoinitiators suitable for the preparation of PSAs include acyloin ethers (e.g., benzoin ethyl ether, benzoin isopropyl ether, anisoin ethyl ether and anisoin isopropyl ether), substituted acyloin ethers (e.g., alpha-hydroxymethyl benzoin ethyl ether), Michler's ketone (4,4'-bis>dimethylamino!benzophenone), and the like. A preferred photoinitiator is 2,2-dimethoxy-2-phenyl acetophenone, commercially available as KB-1.TM. from Sartomer Company, Inc., Exton, Pa.

Preferably, acrylate adhesives may contain a multifunctional acrylate crosslinking agent. Crosslinking agents useful in adhesive of the invention include, but are not limited to glycerol diacrylate, glycerol triacrylate, ethylene glycol diacrylate, diethylene glycol diacrylate, triethylene glycol dimethacrylate, 1,3-propanediol dimethacrylate, 1,6-hexanediol diacrylate, 1,8-octanediol diacrylate, neopentyl glycol diacrylate, trimethylolpropane triacrylate, 1,4-cyclohexanediol diacrylate, pentaerythritol triacrylate, -tetraacrylate and -tetramethacrylate, and combinations thereof. The preferred crosslinking, agents are multifunctional acrylates, most preferably 1,6-hexanediol diacrylate. Alternatively, photoactive crosslinking agents may be used in conjunction with the photoinitiator. Photoactive crosslinking agents include benzaldehyde, acetaldehyde, anthraquinone, substituted anthraquinones, various benzophenone-type compounds and certain chromophore-substituted vinyl halomethyl-s-triazines, such as 2,4-bis(trichloromethyl)-6-p-methoxystyryl-s-triazine.

Acrylate adhesives useful in the invention may further comprise additives, adjuncts, and fillers, as are known in the art. In particular, the use of tackifying agents, or "tackfiers," in adhesive formulations is a common practice. Tackifiers can be present in amounts ranging from about 0% to about 80% by weight, preferably 0 to about 50% by weight. The choice of a particular tackifier can be dependent upon factors such as the nature of the adhesive, the nature of the substrate, the operating or application temperature(s) for the adhesive, etc, and the present disclosure should be taken to include tackifiers of all chemical classes insofar as they are compatible with the acrylate adhesives. Tackifiers useful in the present invention include rosins and rosin derivatives, aromatic hydrocarbon resins, aliphatic hydrocarbon resins, terpene resins, modified and/or special resins, and combinations thereof. For example, useful tackifiers include the Regalrez.TM. family of hydrocarbon resins, commercially available from Hercules, Inc., Wilmington, Del.

A preferred adhesive composition comprises a copolymer of about 90 parts by weight isooctylacryate and 10 parts by weight acrylic acid preferably crosslinked with a bis-aziridine crosslinker. The adhesive layer may have a thickness ranging from about 0.5-10 mils (12 to 250 μm), more preferably ranging from about 1-5 mils (25 to 125 μm), and most preferably ranging from about 1-2 mils (25 to 50 μm).

The pressure sensitive adhesive may be applied to the polymer layer using any suitable process. If the pressure sensitive adhesive is dissolved in a solvent, the adhesive may be coated onto the polymer layer followed by evaporation of the solvent, for example, by heating in an oven. Alternatively, a solvent borne adhesive may be coated directly onto the release liner followed by evaporation (or partial evaporation) of the solvent. The adhesive-coated release liner is then mated with the polymer layer, for example, with via a lamination process in order to bond the pressure sensitive adhesive to the polymer layer.

Solventless processes may also be suitable for application of the presssure sensitive adhesive to the polymer backing or the release liner. For example, the pressure sensitive adhesive may be applied via a hot melt coating process or may be applied as a 100% solids formulation followed by radiation curing.

To aid in the application of the finishing material to the teak wood substrate it may be desirable to utilize a repositionable pressure sensitive adhesive. One known technique for imparting repositionability to a pressure sensitive adhesive involves providing a layer of a water-soluble coating over the pressure sensitive adhesive. The water-soluble coating functions to detackify the pressure sensitive adhesive. During wet application of the finishing material to the substrate, the water-soluble coating dissolves thereby exposing the pressure sensitive adhesive for bonding to the substrate. Upon removal of the water and water-soluble coating, for example, by squeegeeing and drying, the pressure sensitive adhesive fully bonds to the substrate. Examples of materials suitable for forming a water-soluble coating are reported in U.S. Pat. No. 3,681,179 (Theissen) and include methyl cellulose (15 cps. MC Standard "Methocel" commercially available from Dow Chemical Co.), vinyl ether/maleic anhydride copolymers, casein, cooked starch, polyvinyl-pyrrolidone, and hide glue.

U.S. Pat. No. 3,314,838 (Erwin) reports a pressure sensitive adhesives containing small, thin-walled, spheroid particles. The spheroid particles interrupt the bonding of the pressure sensitive adhesives until sufficient pressure is applied to the adhesive to crush the particles thereby causing the adhesive to fully contact the substrate. Another method by which a pressure sensitive adhesive may made repositionable is to form a microreplicated structure in the surface of the adhesive. WO 94/00525 (Wilson et al.) reports an adhesive sheet comprising a backing and an adhesive layer having at least one topologically microstructured surface comprising a plurality of pegs (optionally containing one or more beads) substantially distributed and protruding outwardly from the adhesive layer wherein the pegs have essentially flat tops that comprise less than 25% of the total surface contact area of the adhesive layer, and have a height of at least 15 μm. WO 98/29516 (Sher et al.) reports an adhesive having a microstructured topography prepared from contacting a microembossed pattern to a layer of adhesive. The topography of the microstructured adhesive surface controls the repositionability of the adhesive. Articles having microreplicated adhesive surfaces are also disclosed that have an advantage of providing microchannels for fluids egress for an effective period of time. U.S. Ser. No. 09/311,101 (Mikami et al.) reports an adhesive having a channeled microstructured adhesive. The channels comprise a volume of at least $1 \times 10^3$ μm$^3$ per any 500 μm diameter circular area in the adhesive. The channels are utilized to create exit pathways for fluid egress to a periphery of the adhesive layer of the finishing film. The channels are substantially undetectable after final application of the finishing film to a substrate in accordance with the method of the present invention. When provided with an adhesive layer having a microstructured surface the finishing film may be slid over the surface of the wood substrate and may be easily removed from the surface of the substrate until enough pressure is applied to enable a bond between the adhesive and the surface of the wood substrate. Suitable repositionable adhesives are also reported, for example, in U.S. Pat. No. 5,650,215 (Mazurek et al.) and in EP 926214 (Bridgestone).

Application of Finishing Film to the Substrate:

Prior to application of the finishing material to the wood substrate, the wood substrate is preferably prepared to be finished.

If the wood substrate was previously finished (e.g., with a conventional liquid applied coating) it will generally be necessary to remove at least a portion of the previously applied coating prior to finishing the wood substrate according to the method of the present invention. In this way, any loose coating that may interfere with the adhesion of the finishing material is removed from the surface of the wood substrate. Removal of the previously applied coating(s) may be accomplished, for example, by known techniques such as chemical and/or mechanical treatment. For example, the previously applied coating(s) may be removed by sanding and/or scraping the wood substrate with sandpaper or a scraper. Chemical means may also be employed, optionally in combination with mechanical means, to remove any previously applied coating(s) from the wood substrate. After removal of any previously applied coating(s), the wood substrate must then. be finished to provide a surface finish suitable for application of the finishing material. Preferably, the wood substrate is first sanded with a fine grade sandpaper. In some instances, it may be necessary to sand the substrate multiple times with progressively finer sandpaper in order to achieve the desired surface finish. After sanding, the wood substrate is then cleaned of debris using a wet cloth, a tack cloth or other means. In a preferred embodiment of the method of the present invention after removal of the deteriorated coating the wood substrate is then finished with 1 to 2 coats of a liquid varnish material, such as that commercially available under the trade designation "Z SPAR CAPTAIN'S VARNISH" (available from Kop-Coat, Inc., Rockaway N.J.).

If the wood substrate has not been previously finished then it may be desirable to sand the surface of the wood in order to provide a smooth finish before applying the finishing film in accordance with the method of the present invention. In a preferred embodiment the wood surface is finished with from 1 to 4 coats, preferably 3 to 4 coats, of a liquid varnish material such as that commercially available under the trade designation "Z SPAR CAPTAIN'S VARNISH" (available from Kop-Coat Inc., Rockaway N.J.) prior to application of the finishing film.

After preparing the wood substrate, the finishing film is then adhered to the surface of the substrate. In one variation of the method of the present invention, the surface of the wood substrate is first wet with a wetting solution prior to application of the finishing film. The wood substrate may be wet using a wetting solution of water, a dilute solution of a detergent in water, or a mixture of water and a water-soluble organic liquid, for example, a mixture comprising 75%-wt water and 25%-wt isopropanol. A wet process may be preferred in order to assist the application process, for example, by allowing the finishing film to be repositioned prior to adhesive bonding and/or in order to improve the contact between the pressure sensitive adhesive and the wood substrate. When a wet application process is used, the bulk of the wetting solution is preferably removed from under the finishing film by applying pressure to the surface of the film, for example, with a squeegee. In another variation of the method of the present invention, the finishing film is applied to the wood substrate in a dry process. Prior to bonding the finishing film to the wood surface the film may optionally be trimmed to the desired size and shape. In many instances, however, it will be preferred to oversize the piece of finishing film to be applied and to trim the finishing film to the desired size after it has been adhered to the wood substrate.

When finishing a wood surface according to the method of the present invention it may be necessary, at least in some instances, to stretch and/or to bend the finishing film in order to conform the finishing film to a curved or compound curved surface. Stetching and/or bending of the finishing film may be facilitated by applying heat to the film, for example, with a heat gun.

The following non-limiting Examples will further illustrate the invention. All parts, percentages, ratios, and the like, in the Examples are by weight, unless otherwise indicated.

EXAMPLES

Samples of wood substrate were first varnished with 4 layers of varnish (commercially available under the trade designation "Z SPAR CAPTAIN'S VARNISH" from Kop-Coat Inc., Rockaway N.J.). The finishing film used was commercially available from Minnesota Mining and Manufacturing Company under the trade designation "SCOTCHCAL PAINT PROTECTION FILM PUL 0612" and comprised a 6 mil polymer film comprising an aliphatic polycaprolactone based thermoplastic urethane elastomer commercially available under the trade designation "TECORFLEX A-954" from Thermedics Inc. (Woburn Mass.). The polymer film had on its outer surface a clear coat comprising a waterborne polyurethane coating (commercially available under the trade designation "Neorez 9465" from Avecia Inc, Willmington Del.). The opposite surface of the polymer film was corona treated and was laminated to a 1.3 mil thick layer of high intrinsic viscosity acrylic pressure sensitive adhesive comprising a bisamide crosslinked 90%-wt isooctyl acrylate, 10%-wt acrylic acrylic acid.

The finishing film was applied to the substrate using a wet application method. The wetting solution comprised a 25/75%-wt mixture of isopropanol and water. A plastic squeegee was used to apply pressure to the top surface of the finishing film in order to force the pressure sensitive adhesive into contact with the wood substrate and in order to remove the bulk of the application liquid from between the adhesive and the teak substrate. The finishing film was applied to a 7 in. long piece of wood such that 5 inches of length was protected by the finishing film and 2 inches of length was uncovered. The samples were subjected to natural weathering exposure in Arizona, Florida, and Minnesota and to accelerated weathering exposure. 60 degree gloss measurements were taken at various intervals throughout the weathering exposure and are presented in the tables below.

60 Degree Gloss After Natural Weathering Exposure

| Exposure Location | Angle of Exposure | Wood Type/ Finish | Control | 6 month | 12 month | 18 month | 24 month |
|---|---|---|---|---|---|---|---|
| Arizona | 5 degree | Cedar/ Varnish Only | 18.1 | 6.5 | | | |
| | | Film over Varnish | 90.2 | 66.7 | | | |
| Florida | 5 degree | Cedar/ Varnish Only | 18.1 | 1.5 | | | |
| | | Film over Varnish | 90.2 | 86.7 | | | |
| Minnesota | 5 degree | Cedar/ Varnish Only | 18.1 | 10.5 | | | |
| | | Film over Varnish | 90.2 | 84.7 | | | |
| Arizona | 90 degree | Cedar/ Varnish Only | 18.1 | 15.8 | | | |
| | | Film over Varnish | 90.2 | 88.2 | | | |
| Florida | 90 degree | Cedar/ Varnish Only | 18.1 | 7.4 | | | |
| | | Film over Varnish | 90.2 | 85.1 | | | |
| Minnesota | 90 degree | Cedar/ Varnish Only | 18.1 | 9.4 | | | |
| | | Film over Varnish | 90.2 | 81.0 | | | |
| Florida | 5 degree | Teak/ Varnish Only | 85.1 | 39.5 | 6.1 | 2.8 | |
| | | Film over Varnish | 90.3 | 81.4 | 82.2 | 74.8 | |

60 Degree Gloss After Accelerated Weathering Exposure

| Accelerated Weathering Cycle | Wood Type/ Finish | Control | 500 hrs | 1000 hrs | 1500 hrs |
|---|---|---|---|---|---|
| 3-2 Cycle | Teak/ Varnish Only | 85.1 | 72 | | 13.5 |
| | Film over Varnish | 90.3 | 87 | | 84 |
| 3-1 Cycle | Cedar/ Varnish Only | 18.1 | 10.5 | 1.9 | |
| | Film over Varnish | 90.3 | 84.7 | 86.7 | |
| 3-2 Cycle | Cedar/ Varnish Only | 18.1 | 3.1 | 3.5 | |
| | Film over Varnish | 90.3 | 88.7 | 89.6 | |

Teak sample was varnished with 4 layers of Z-Sharp Flagship Varnish 2015. Film was applied over the varnished teak.
Cedar sample was prepared by applying 2 coats of Minwax Clear shield Semi gloss varnish on 4 side smooth 6 "beveled cedar lap siding.
3-1 Cycle corresponds to ASTM G26 Type B-BH
3-2 Cycle corresponds to ASTM G26 Type BH (also SAE J1960).

The complete disclosures of all patents, patent applications, and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method of finishing a wood surface on a boat for exterior exposure of the wood, said method comprising the steps of:
   (a) providing a finishing film material in the form of a sheet, said finishing material consisting of;

(i) a flexible polymeric sheet material comprising an aliphalic polyurethane, said sheet having a percent elongation of about 60% or greater, and said sheet further having a first major surface and a second major surface;

(ii) a pressure sensitive adhesive layer covering at least a portion of the first major surface of die sheet material;

(b) providing a wood substrate on a boat having a surface; and (c) adhering the adhesive layer of the finishing film material to the surface of the wood by placing the adhesive layer of the finishing film in contact with the surface of the wood substrate and optionally applying pressure and/or heat to at least a portion of the finishing film wherein after applying the finishing film, all of the wood surface is visible through the film.

2. The method of claim 1, wherein the wood substrate is selected from the group consisting of teak and mahogany.

3. The method of claim 1, wherein the polymeric sheet material has a thickness ranging from about 3 to 18 mils.

4. The method of claim 3, wherein the polymeric sheet material has a thickness ranging from about 5 to 12 mils.

5. The method of claim 1, wherein the polymeric sheet material comprises an ultraviolet absorber.

6. The method of claim 1, wherein the adhesive layer is an acrylic adhesive.

7. The method of claim 1, wherein the adhesive layer has a thickness ranging from about 0.5 to 10 mils.

8. The method of claim 1, wherein the adhesive layer has a thickness ranging film about 1 to 5 mils.

9. The method of claim 1, further including the step of:

(a) coating the surface of the wood substrate with a liquid coating composition comprising a polymer or polymer precursor dispersed or dissolved in a liquid.

10. The method of claim 9, wherein the liquid coating composition comprises a polyurethane polymer dispersed or dissolved in a solvent.

11. The method of claim 1, further including the step of:

(a) wetting the surface of the wood substrate with a wetting solution prior to step (c).

12. The method of claim 1, wherein the adhesive layer is repositionable.

13. The method of claim 1, wherein the adhesive layer has a microstructured surface.

14. The method of claim 1, wherein the adhesive layer includes a water-soluble detackifying overcoat.

15. A method of finishing a wood surface on a boat for exterior exposure of the wood, said method comprising the steps of:

(a) providing a finishing film material in the form of a sheet said finishing material consisting of:

(i) a flexible aliphatic polyurethane sheet material having a first major surface and a second major surface;

(ii) an acrylic pressure sensitive adhesive layer covering at least a portion of the first major surface of the sheet material;

(b) providing a wood substrate a boat having a surface;

(c) coating the surface of the wood substrate with a liquid coating composition comprising a polymer or polymer precursor dispersed or dissolved in a liquid, (d) wetting the surfbce of the wood substrate with a wetting solution; and (e) adhering the adhesive layer of the finishing film material to the surface of the wood by placing the adhesive layer of die finishing film in contact with the surface of the wood substrate and optionally applying pressure and/or beat to at least a portion of the finishing film, wherein after applying the finishing film, all of the wood surface is visible through the film.

* * * * *